United States Patent
Fujisaki et al.

(10) Patent No.: US 10,146,894 B2
(45) Date of Patent: Dec. 4, 2018

(54) MAGNETIZATION VECTOR STORING METHOD, MAGNETIZATION VECTOR DATA COMPRESSION METHOD, AND MAGNETIC FIELD SIMULATOR DEVICE

(71) Applicant: FUJITSU LIMITED, Kawasaki-shi, Kanagawa (JP)

(72) Inventors: Jun Fujisaki, Kawasaki (JP); Koichi Shimizu, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 430 days.

(21) Appl. No.: 14/944,510

(22) Filed: Nov. 18, 2015

(65) Prior Publication Data

US 2016/0196372 A1 Jul. 7, 2016

(30) Foreign Application Priority Data

Jan. 5, 2015 (JP) .................................. 2015-000209

(51) Int. Cl.
- *G06F 7/60* (2006.01)
- *G06F 17/10* (2006.01)
- *G06F 17/50* (2006.01)

(52) U.S. Cl.
CPC ................ *G06F 17/5009* (2013.01)

(58) Field of Classification Search
CPC ................................................. G06F 17/5009
USPC ............................................................. 703/2
See application file for complete search history.

(56) References Cited

U.S. PATENT DOCUMENTS

| | | | |
|---|---|---|---|
| 2001/0055032 A1 | 12/2001 | Saito et al. | |
| 2004/0128331 A1* | 7/2004 | Hinds | G06F 9/30025 708/204 |
| 2008/0040409 A1 | 2/2008 | Matsuzaki | |
| 2010/0280778 A1 | 11/2010 | Ohta | |
| 2013/0006593 A1* | 1/2013 | Uehara | G01R 33/0064 703/2 |

FOREIGN PATENT DOCUMENTS

| | | |
|---|---|---|
| JP | 2002-8060 A | 1/2002 |
| JP | 2008-33729 | 2/2008 |
| JP | 2009-93662 | 4/2009 |

(Continued)

OTHER PUBLICATIONS

Otsuka, Yuto et al., "Fundamental research on multi-bit recording using frequency selectivity of microwave-assisted magnetization reversal", ITE Technical Report, The Institute of Image Information and Television Engineers (ITE), Nov. 9, 2012, vol. 36, No. 49, pp. 11-16.

(Continued)

*Primary Examiner* — Timothy A Mudrick
(74) *Attorney, Agent, or Firm* — Fujitsu Patent Center

(57) ABSTRACT

A magnetization vector storing method includes: acquiring, by a computer, a saturation magnetization value of a material to be simulated from a database indicating the saturation magnetization value of each material; dividing each component of a magnetization vector indicating a magnetization state of the material to be simulated by the saturation magnetization value; and converting each component of the magnetization vector obtained after the dividing using the saturation magnetization into an integer value and storing the integer value in a storage unit.

12 Claims, 8 Drawing Sheets

(56) References Cited

FOREIGN PATENT DOCUMENTS

| | | |
|---|---|---|
| JP | 2010-262338 | 11/2010 |
| JP | 2012-37321 | 2/2012 |

OTHER PUBLICATIONS

Japanese Office Action dated Oct. 23, 2018 for corresponding Japanese Patent Application No. 2015-000209, with English Translation, 7 pages.

* cited by examiner

FIG. 6

| MAGNETIC SUBSTANCE NAME | SATURATION MAGNETISM VALUE Ms[T] | ANISOTROPY CONSTANT K [MJ/m3] | CURIE TEMPERATURE T [K] |
|---|---|---|---|
| $Nd_2Fe_{14}B$ | 1.60 | 4.5 | 592 |
| $SmCo_5$ | 1.07 | 17.2 | 1000 |
| $NdCo_5$ | 1.22 | 0.24 | 910 |
| ... | ... | ... | ... |

MAGNETIZATION VECTOR STORING METHOD, MAGNETIZATION VECTOR DATA COMPRESSION METHOD, AND MAGNETIC FIELD SIMULATOR DEVICE

CROSS-REFERENCE TO RELATED APPLICATION

This application is based upon and claims the benefit of priority from the prior Japanese Patent Application No. 2015-000209, filed on Jan. 5, 2015, the entire contents of which are incorporated herein by reference.

FIELD

The embodiments discussed herein are related to a magnetization vector storing method, a magnetization vector data compression method, and a magnetic field simulator device.

BACKGROUND

Computer simulations are being used in various fields.

Related techniques are disclosed in, for example, Japanese Laid-open Patent Publication No. 2009-093662, Japanese Laid-open Patent Publication No. 2008-033729, Japanese Laid-open Patent Publication No. 2012-037321, and Japanese Laid-open Patent Publication No. 2010-262338.

SUMMARY

According to one aspect of the embodiments, a magnetization vector storing method includes: acquiring, by a computer, a saturation magnetization value of a material to be simulated from a database indicating the saturation magnetization value of each material; dividing each component of a magnetization vector indicating a magnetization state of the material to be simulated by the saturation magnetization value; and converting each component of the magnetization vector obtained after the dividing using the saturation magnetization into an integer value and storing the integer value in a storage unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a table illustrating an example of a data configuration of a material database;

FIG. 8A and FIG. 8B are diagrams illustrating examples of data for visualization.

DESCRIPTION OF EMBODIMENTS

In a computer simulation, for example, a number is converted from a floating point to a fixed point such that an amount of data for a numerical calculation is reduced. Further, the processing time becomes shortened by conducting the numerical calculation using the fixed point.

For example, in the conversion from the floating point value to a corresponding fixed point, a mantissa value is shifted according to a shift count value and rounding off is applied to the shifted mantissa value to generate the fixed point.

A range of value of a target variable is detected based on a history of a change of a value of a floating point type variable, and the target variable is converted to a fixed point type based on the detected range.

A rare earth magnet is used in, for example, an electric vehicle or electronic device. For example, a rare earth element such as neodymium or dysprosium is used in a magnet used at a high temperature environment such as an on-vehicle motor in order to maintain strong magnetism even in a limit area/region. However, there is possibility that the supply of rare earth elements depends from foreign countries and the prices of rare earth elements may be increased as well. Therefore, it is expected that a magnet is developed without using rare-earth elements.

In the following, a computer simulation executed in magnet development may be referred to as a magnetic field simulation. Also, in the magnetic field simulation, a data amount may become enormous in a case where a large number of elements are needed for calculation in preparation of data for visualization of a magnetization state of a magnetic substance.

Figure 1:
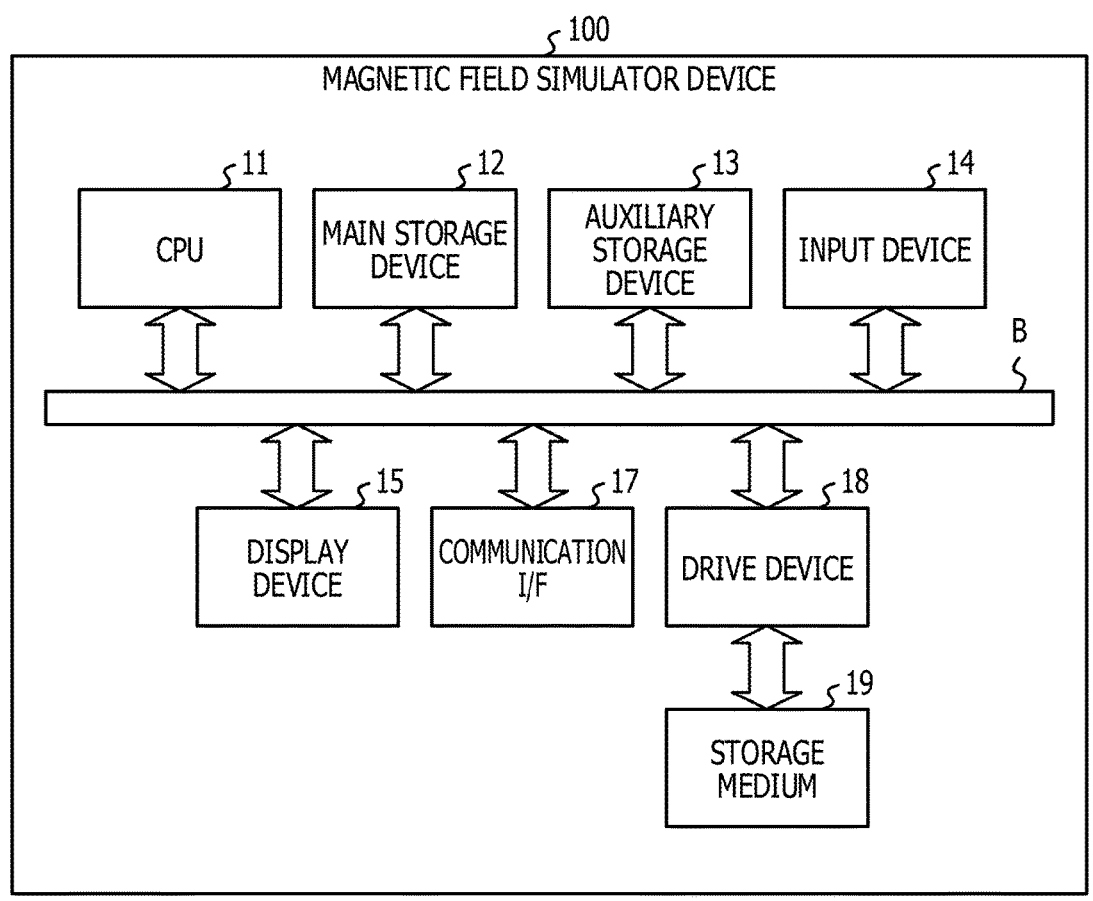
FIG. 1 is a diagram illustrating an exemplary hardware configuration of a magnetic field simulator device.

FIG. 1 is a diagram illustrating an exemplary hardware configuration of a magnetic field simulator device. A magnetic field simulator device 100 illustrated in FIG. 1 may be an information processing device controlled by a computer device. The magnetic field simulator device 100 includes a central processing unit (CPU) 11, a main storage device 12, an auxiliary storage device 13, an input device 14, a display device 15, a communication I/F (interface) 17, and a drive device 18, and these devices are coupled with each other via a bus B.

The CPU 11 controls the magnetic field simulator device 100 according to a program stored in the main storage device 12. A random access memory (RAM) or a read only memory (ROM), for example, is used as the main storage device 12. A program executed in the CPU 11, data required for processing by the CPU 11, and data obtained in the processing by the CPU 11, for example, are stored or temporarily stored in the main storage device 12.

For example, a hard disk drive (HDD) is used as the auxiliary storage device 13 and data such as a program for executing various processings are stored therein. At least a portion of the program stored in the auxiliary storage device 13 is loaded onto the main storage device 12 and executed by the CPU 11 such that various processings are implemented.

The input device 14 includes, for example, a mouse or a keyboard which is used by a user to input various information for the processing in the magnetic field simulator device 100. The display device 15 displays various information under the control of the CPU 11. The input device 14 and the display device 15 may be a user interface formed by, for example, an integrally built touch panel. The communication I/F 17 conducts a communication over wireless or wired network and or the like. The communication made by the communication I/F 17 may be wireless or wired.

The program to implement the processing of the magnetic field simulator device 100 is provided to the magnetic field simulator device 100 by a storage medium 19 such as, for example, a compact disc read-only memory (CD-ROM).

The drive device 18 performs an interfacing between the storage medium 19 set in the drive device 18 such as, for example, the CD-ROM and the magnetic field simulator device 100.

The program to implement various processings stored in the storage medium 19 is installed in the magnetic field simulator device 100 through the drive device 18. The installed program is executed by the magnetic field simulator device 100.

The storage medium 19 storing the program is not limited to the CD-ROM and may be one or more non-transitory, tangible medium having a computer readable structure. A portable recording medium such as a DVD disk, a USB memory in addition to the CD-ROM or, a semiconductor memory such as a flash memory may be used as the computer readable storage medium.

Figure 2:
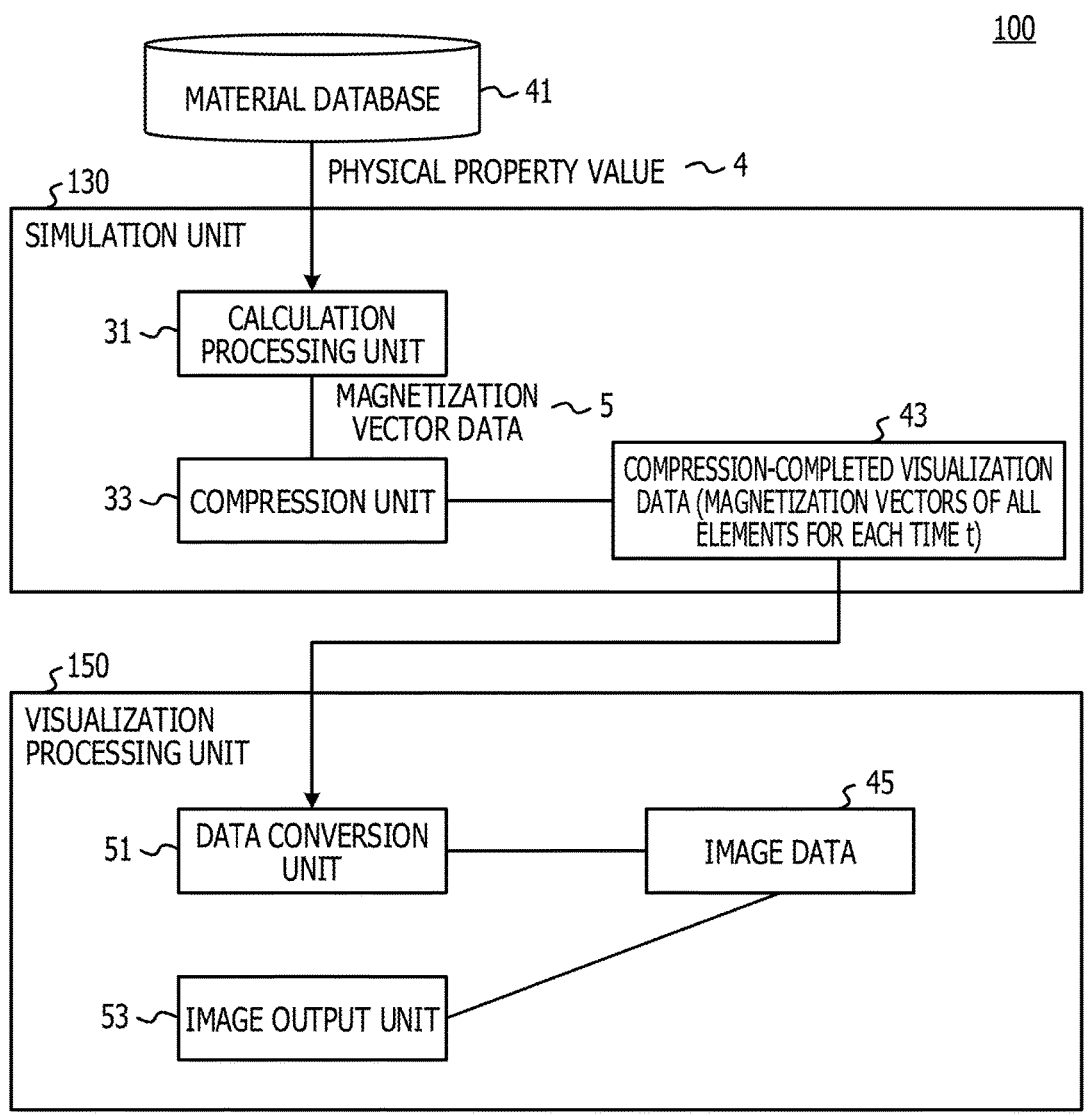
FIG. 2 is a diagram illustrating an exemplary functional configuration of the magnetic field simulator device.

FIG. 2 is a diagram illustrating an exemplary functional configuration of the magnetic field simulator device. The magnetic field simulator device 100 illustrated in FIG. 2 includes a simulation unit 130 and a visualization processing unit 150. A material database 41, compression-completed visualization data 43, and image data 45 may be stored in the auxiliary storage device 13.

The simulation unit 130 and the visualization processing unit 150 may be installed in a single computer device and otherwise, the visualization processing unit 150 may be installed in a computer device different from the computer device installed with the simulation unit 130.

The simulation unit 130 receives a physical property value 4 of the magnetic substance to be simulated from the material database 41 as an input and executes the magnetic field simulation. The physical property value 4 of the magnetic substance indicates a value such as a saturation magnetization value Ms[T], an anisotropy constant K [MJ/m$^3$], or the Curie temperature T[K]. The simulation unit 130 includes a calculation processing unit 31 and a compression unit 33. In the simulation unit 130, the calculation processing unit 31 and the compression unit 33 may be operated for each time t.

The calculation processing unit 31 may be a processing unit which executes the magnetic field simulation. The calculation processing unit 31 generates the magnetization vector data 5 that indicates a plurality of values of magnetization vectors indicating a magnetization state of the magnetic substance at time t and stores the magnetization vector data 5 in the auxiliary storage device 13.

The compression unit 33 compresses the magnetization vector data 5 at time t in time series by a compression process and the magnetization vector data 5 is added and stored in the auxiliary storage device 13, thereby generating compression-completed visualization data 43.

In the magnetic field simulation, calculation is performed by inputting the physical property value 4 intrinsic to the magnet material, a value of external magnetic field or the like, and the magnetization vectors indicating a magnetization state of magnet are acquired in time series. A micromagnetic scheme may be used as a calculation method of obtaining the magnetization state of a magnet. In the micromagnetic scheme, the magnetic substance is virtually divided into minute elements and a state of the magnetization vector of each element is obtained by solving an equation called a Landau-Lifshitz-Gilbert (LLG) equation.

Since magnetization information of the magnetic substance are stored in time series as numerical values by the magnetic field simulation, a magnetization process of the magnetic substance may be imaged or visualized.

In the magnetic field simulation, the size of the magnetization vector does not exceed the saturation magnetization value. An absolute value of the magnetization vector may be normalized using the saturation magnetization value as a reference value so as to reduce the data amount of the compression-completed visualization data 43.

The visualization processing unit 150 restores the compression-completed visualization data 43 obtained by the calculation processing unit 31 of the simulation unit 130 to generate the image data 45 to be displayed in the display device 15. The visualization processing unit 150 includes the data conversion unit 51 and the image output unit 53.

The data conversion unit 51 restores the compression-completed visualization data 43 compressed by the simulation unit 130 and converts the restored magnetization vector into the image data 45. The image data 45 is stored in the auxiliary storage device 13. The image output unit 53 displays the image data 45 on the display device 15.

The material database 41 is a database which indicates attribute information of the magnetic substance for each magnetic substance. The compression-completed visualization data 43 is obtained by the calculation processing unit 31 and indicates values of the magnetization vectors of all the elements for each step. For example, the compression-completed visualization data 43 may be data in which the values of the magnetization vectors of all the elements for each step are compressed by the compression unit 33. The image data 45 may be data formed by being subjected to a restoration process of the compression-completed visualization data 43 and a conversion process for display by the data conversion unit 51.

Figure 3:
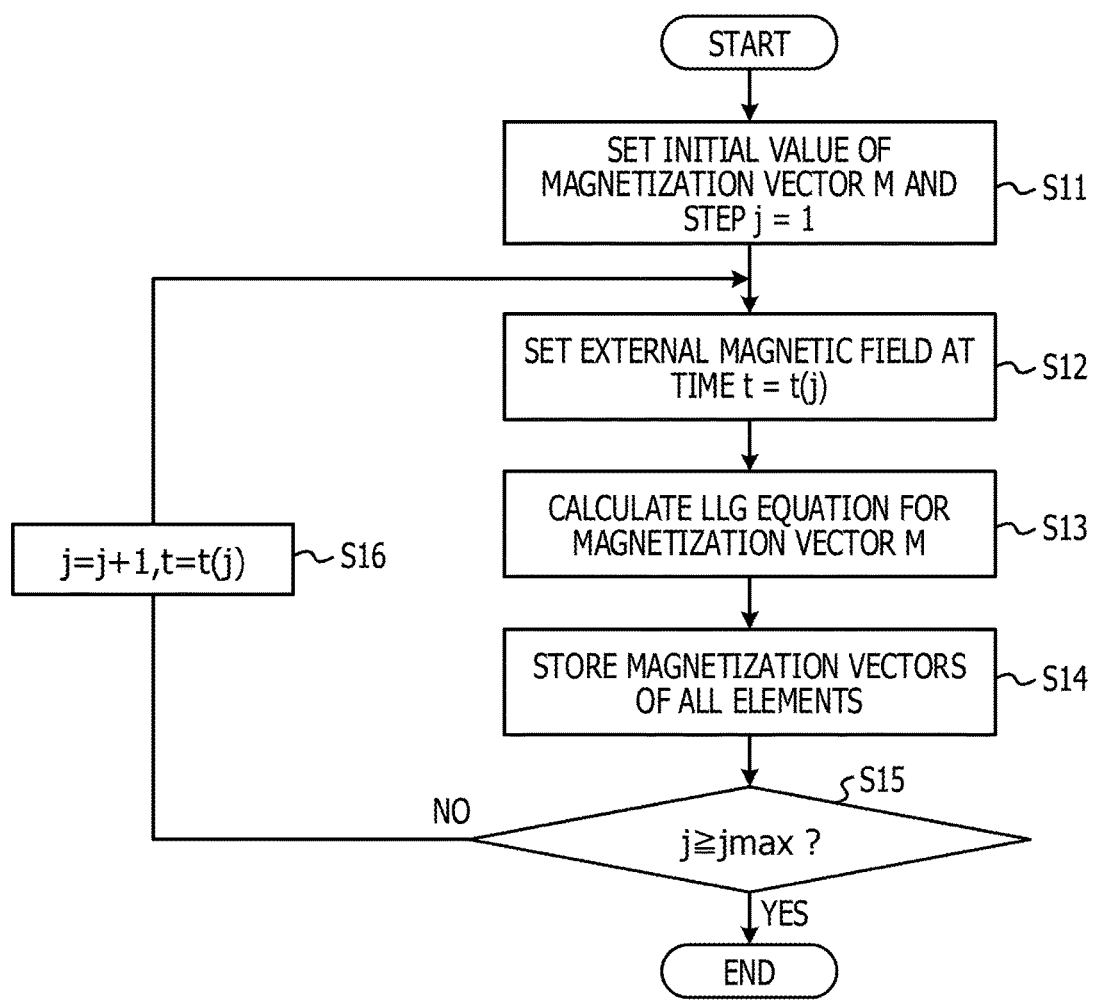
FIG. 3 is a flowchart illustrating an example of a magnetic field simulation by a macro-magnetic scheme.

FIG. 3 is a flowchart illustrating an example of a magnetic field simulation by a macro-magnetic scheme.

In FIG. 3, when the physical property value 4 of the magnetic substance is input from the material database 41, an initial value of the magnetization vector M is set and step j is set to 1 (one) (Operation S11).

The external magnetic field at time t=t(j) is set (Operation S12) and the LLG equation for the magnetization vector M is calculated (Operation S13). The magnetization vectors of all the elements are stored in the auxiliary storage device 13 (Operation S14).

It is determined whether the step j indicates a number equal to or greater than a step number jmax (Operation S16). When it is determined that the step j is less than the step number jmax ("NO" at Operation S16), the step j is incremented by one and time t is updated (Operation S17), and the process goes back to Operation S12 and the same processings as those described above are repeated.

When it is determined that the step j is the number equal to or greater than the step number jmax ("YES" at Operation S16), the magnetic field simulation is ended.

In the magnetic field simulation as described above, since the value of the magnetization vector is maintained as a double-precision floating point number, the visualization data is also stored as the double-precision floating point number when the visualization data is stored.

For example, when the magnetic substance of which a length of one side is 0.3 micrometer is analyzed, the magnetic substance is divided into 500 million pixels. Since the double-precision floating point number is an 8-byte number, when the magnetization vectors of all the elements are stored in time series for 300 steps, the size of visualization data may exceed 30 GB.

The uncompressed visualization data becomes an enormous data file as described above and the burden directed to the computer device is extremely large in the visualization process in which a change in the magnetic field of the magnetic substance is visualized in the elapse of a period of time.

Since the visualization data is prepared during the calculation, the hard disk may be crashed or the calculation processing may be stopped due to an excess of the file size of the visualization data when the capacity of a hard disk of the computer device is small.

For example, in the magnetic field simulation performed by the magnetic field simulator device 100, the compression-completed visualization data 43 is generated and the change in the magnetic field of the magnetic substance is visualized in the elapse of a period of time using the compression-completed visualization data 43. For example, the calculation processing unit 31 may include the compression unit 33.

Figure 4:
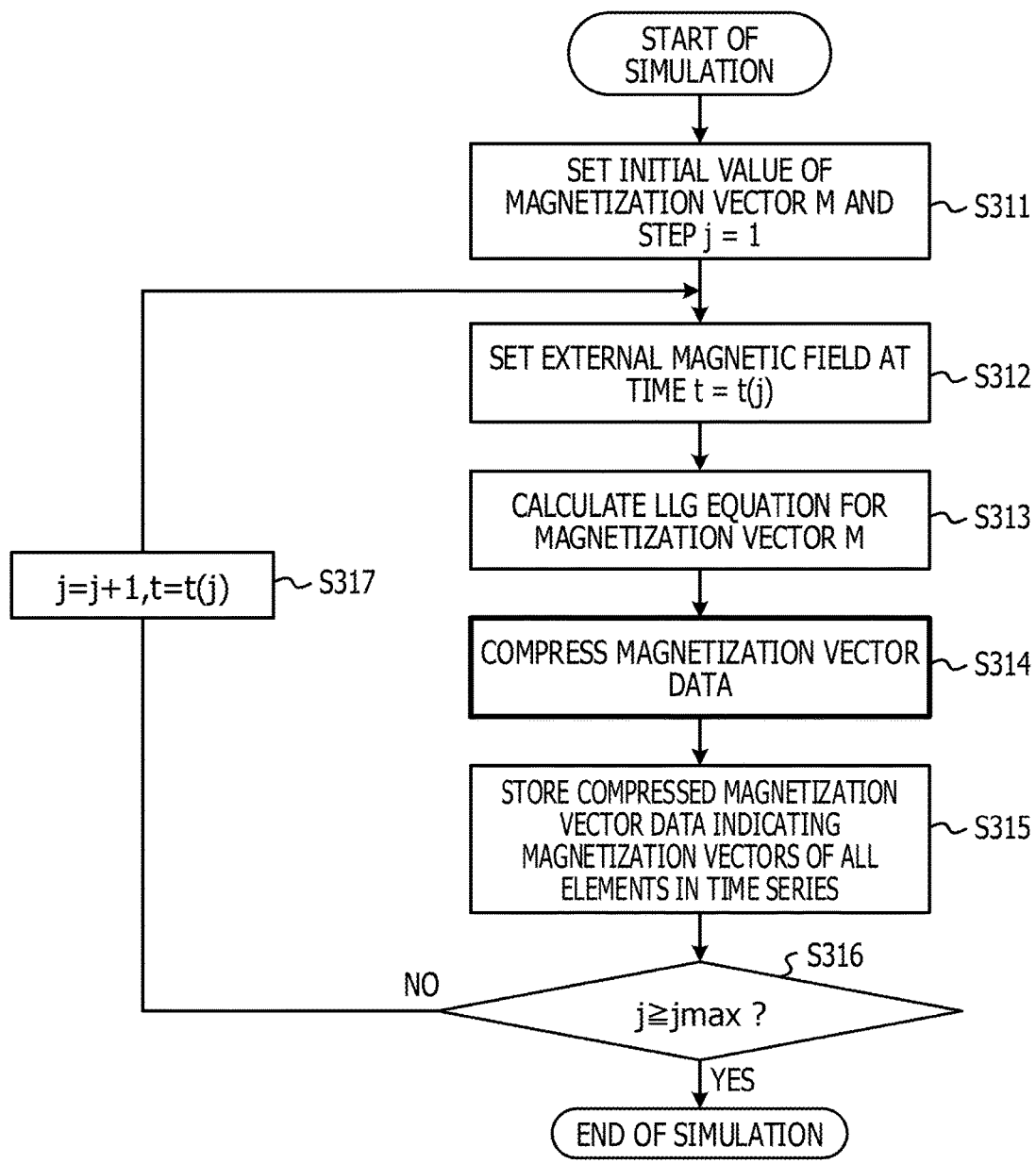
FIG. 4 is a flowchart illustrating an example of a magnetic field simulation.

FIG. 4 is a flowchart illustrating an example of a magnetic field simulation. In FIG. 4, the simulation unit 130 acquires the physical property value 4 of the magnetic substance from the material database 41, sets an initial value of a magnetization vector M, and step j is set to 1 (Operation S311). The magnetic substance intended to be simulated may be designated by the user. The simulation unit 130 receives information specifying the magnetic substance from the input device 14 so as to acquire a corresponding physical property value 4 from the material database 41.

The simulation unit 130 assigns the physical property value 4 and time t=t(j) to the calculation processing unit 31. The calculation processing unit 31 sets the external magnetic field at time t=t(j) (Operation S312) and calculates the LLG equation for the magnetization vector M (Operation S313). The calculation processing unit 31 acquires the magnetization vector data 5 indicating the magnetization vector M of the element at time t=t(j).

The simulation unit 130 assigns the magnetization vector data 5 at time t=t(j) acquired by the calculation processing unit 31 to the compression unit 33 to be compressed. The compression unit 33 compresses the magnetization vector data 5 at time t=t(j) (Operation S314) and stores the magnetization vector data 5 after the compression indicating the magnetization vectors of all the elements at time t=t(j) in the auxiliary storage device 13 in time series (Operation S315).

The simulation unit 130 determines whether the step j indicates a number equal to or greater than a step number jmax (Operation S316). When it is determined that the step j is less than the step number jmax ("NO" at Operation S316), the step j is incremented by one and time t is updated (Operation S317), and the process goes back to Operation S12 and the same processings as those described above are repeated.

Figure 5:
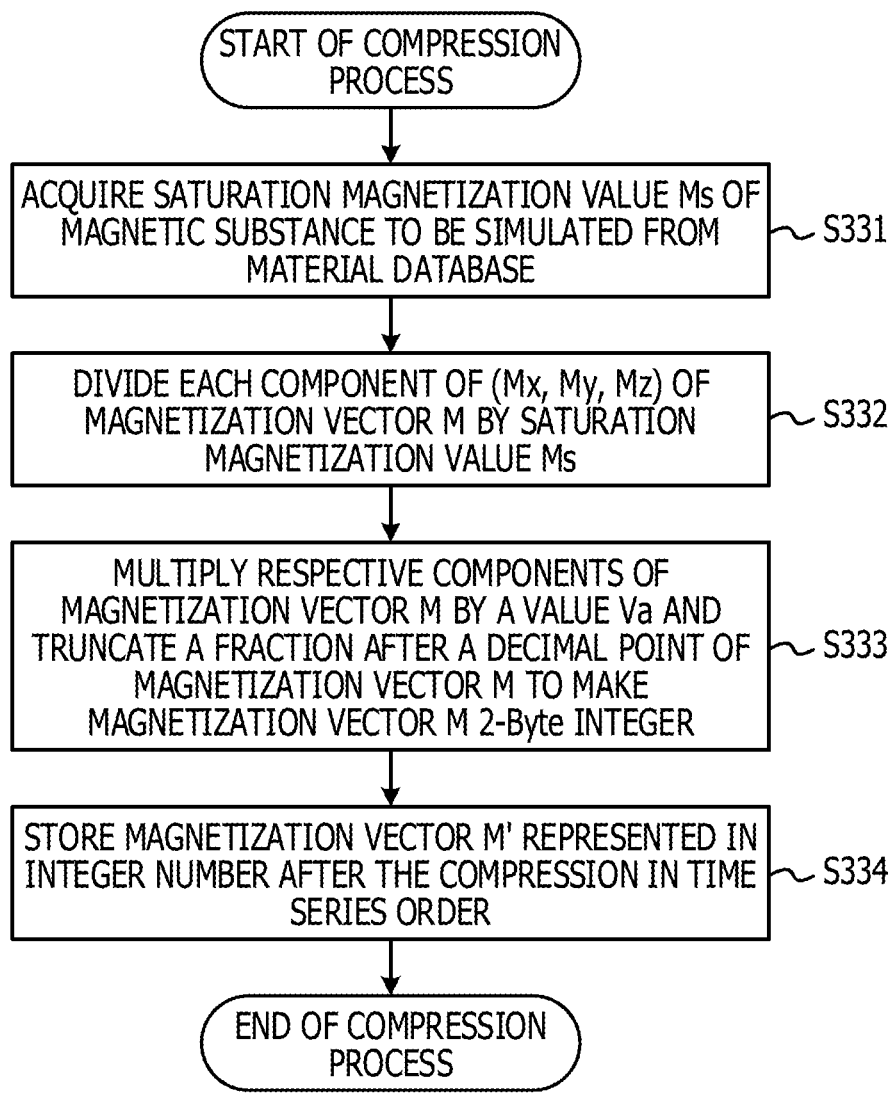
FIG. 5 is a flowchart illustrating an example of a compression process.

FIG. 5 is a flowchart illustrating an example of a compression process. The compression process illustrated in FIG. 5 may be a processing performed by the compression unit 33 at Operation S314 of FIG. 4. In FIG. 5, the compression unit 33 acquires a saturation magnetization value Ms of the magnetic substance to be simulated from the material database 41 (Operation S331).

The compression unit 33 divides each of the components (Mx, My, Mz) of the magnetization vector M by the saturation magnetization value Ms (Operation S332). The compression unit 33 divides the components by the saturation magnetization value Ms so as to normalize an absolute value of the magnetization vector M to 1 (one). The compression unit 33 multiplies each component of the magnetization vector M by a predetermined value Va and truncates a fraction after the decimal point of the magnetization vector M to make the magnetization vector M a 2-byte integer (Operation S333).

The compression unit 33 stores the magnetization vector M' represented in an integer number after the compression in the auxiliary storage device 13 to be arranged in a time series order (Operation S334) and ends the compression process at time t(j).

The compression process described above is repeatedly performed from time t(1) to time t (jmax) such that the compression-completed visualization data 43 indicating the magnetization vector M' of all the elements for each time t(j) in time series are generated in the auxiliary storage device 13.

FIG. 6 is a table illustrating an example of a data configuration of a material database. The material database 41 illustrated in FIG. 6 may include items such as, the magnetic substance name, the saturation magnetization value Ms [T], the anisotropy constant K[MJ/m$^3$], or the Curie temperature T[K] for each magnetic substance.

The magnetic substance name indicates information identifying a magnetic substance and is represented by, for example, a molecular formula. The saturation magnetization value Ms[T] indicates the saturation magnetization value of the magnetic substance. The anisotropy constant K[MJ/m$^3$] indicates the value of the anisotropy constant of the magnetic substance. The Curie temperature T[K] indicates the curie temperature of the magnetic substance.

The values, for example, the saturation magnetization value Ms[T], the anisotropy constant K[MJ/m$^3$], and the Curie temperature T[K] correspond to the physical property value 4. The saturation magnetization value Ms[T] is used for normalization of the magnetization vector M in the compression unit 33.

In the magnetic field simulation, since the size of the magnetization vector M does not exceed the saturation magnetization value, the absolute value of the magnetization vector is normalized using the saturation magnetization value as a reference value. For the value Va used at Operation S333 of FIG. 5, since a 2-byte integer has a range from −32,768 to 32,767, a value equal to or less than 32,767 may be set as a value Va.

Figure 7:
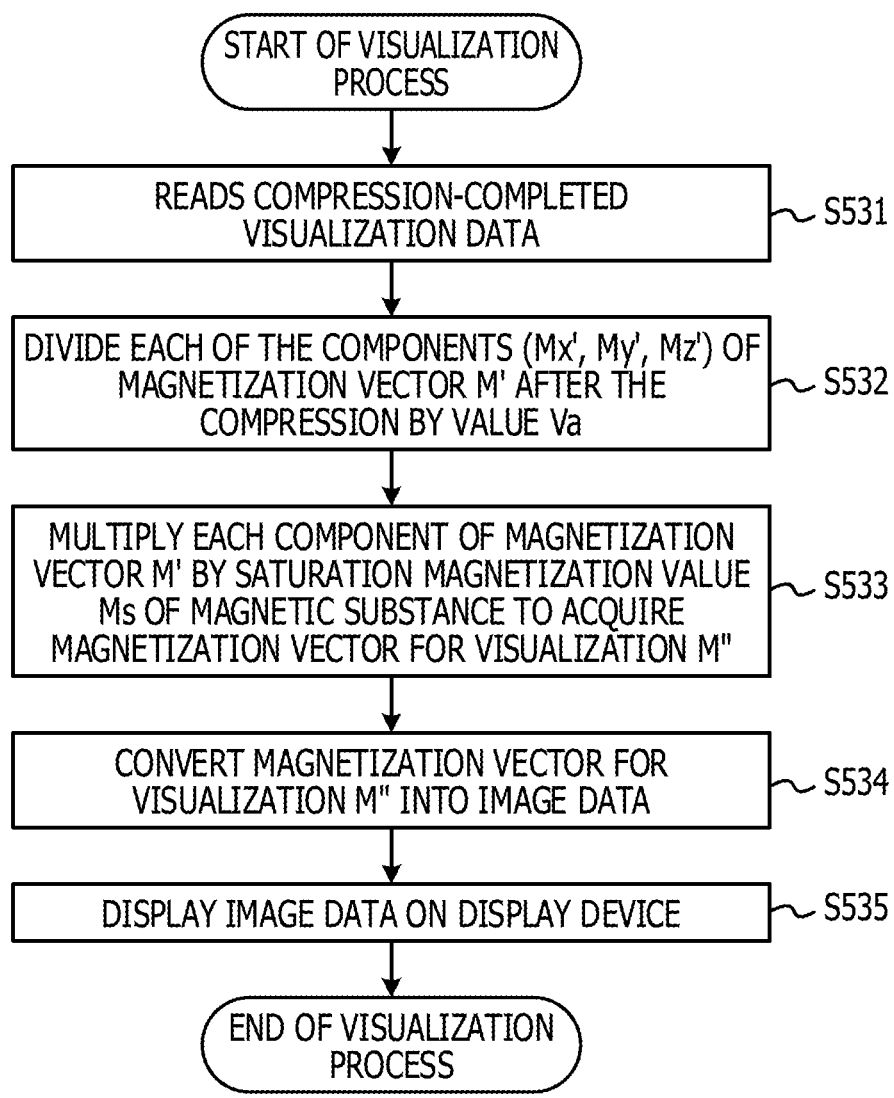
FIG. 7 is a flowchart illustrating an example of a visualization process.

FIG. 7 is a flowchart illustrating an example of a visualization process. The visualization process illustrated in FIG. 7 may be executed by the visualization processing unit 150 illustrated in FIG. 2 using the compression-completed visualization data 43. In FIG. 7, the visualization processing unit 150 reads the compression-competed visualization data 43 (Operation S531) and causes the data conversion unit 51 to initiate a data conversion processing by assigning the read data to the data conversion unit 51.

The data conversion unit 51 divides each of the components (Mx', My', Mz') of the magnetization vector M' after the compression by the value Va (Operation S532) and multiplies each component of the magnetization vector M' by the saturation magnetization value Ms of the magnetic substance to acquire a magnetization vector for visualization M" (Operation S533).

The data conversion unit 51 converts the magnetization vector for visualization M" into the image data 45 and stores the image data 45 in the auxiliary storage device 13 (Operation S534). The image data 45 may be an image data obtained by making the magnetization state of the magnetic substance for each time t visually recognizable.

When the visualization data is restored and converted into the image data by the data conversion unit 51, the visualization processing unit 150 causes the image output unit 53 to display the image data 45 on the display device 15 (Operation S535).

For example, in a case where a target to be simulated is a neodymium magnet (Nd2Fe14B), the data compression at the time of simulation and the data restoration at the time of visualization are represented in the following.

Material to be simulated: neodymium magnet (Nd2Fe14B)

Components of a single magnetization vector to be stored:
(Mx, My, Mz)=(0.02340808, 1.59979760, 0.00998811)

An absolute value of magnetization vector:
Ms=1.6 (the saturation magnetization value of the neodymium magnet read from the material database)

Components of the magnetization vector after the compression:
(Mx', My', Mz')

Components of the magnetization vector at the time of visualization:
(Mx", My", Mz")

A value Va:
10,000

At the time of data compression, each component of (Mx, My, Mz)=(0.02340808, 1.59979760, 0.00998811) is divided by the saturation magnetization value 1.6 of the neodymium magnet and the absolute value is normalized to 1 (one).

Each of the components (0.01463005, 0.99987350, 0.00624257) obtained by the above-described calculation at the time of data compression is multiplied by 10000.

A fraction after the decimal point of each of the components (146.3005, 9998.7350, 62.4257) obtained by the above-described multiplication is truncated and the truncated values are stored as the components of the magnetization vector M' after the compression.

The truncated values (146, 9998, 62) corresponding to the components (Mx', My', Mz'), respectively, are obtained. At the time of visualization, each of the components (Mx', My', Mz') corresponding to the truncated values (146, 9998, 62) is divided by 10000.

Each of the components (0.0146, 0.9998, 0.0062) obtained by the above-described division is multiplied by the saturation magnetization value of 1.6 of the neodymium magnet and the multiplication results are set as the magnetization vector for visualization M".

Figures 8A, 8B:
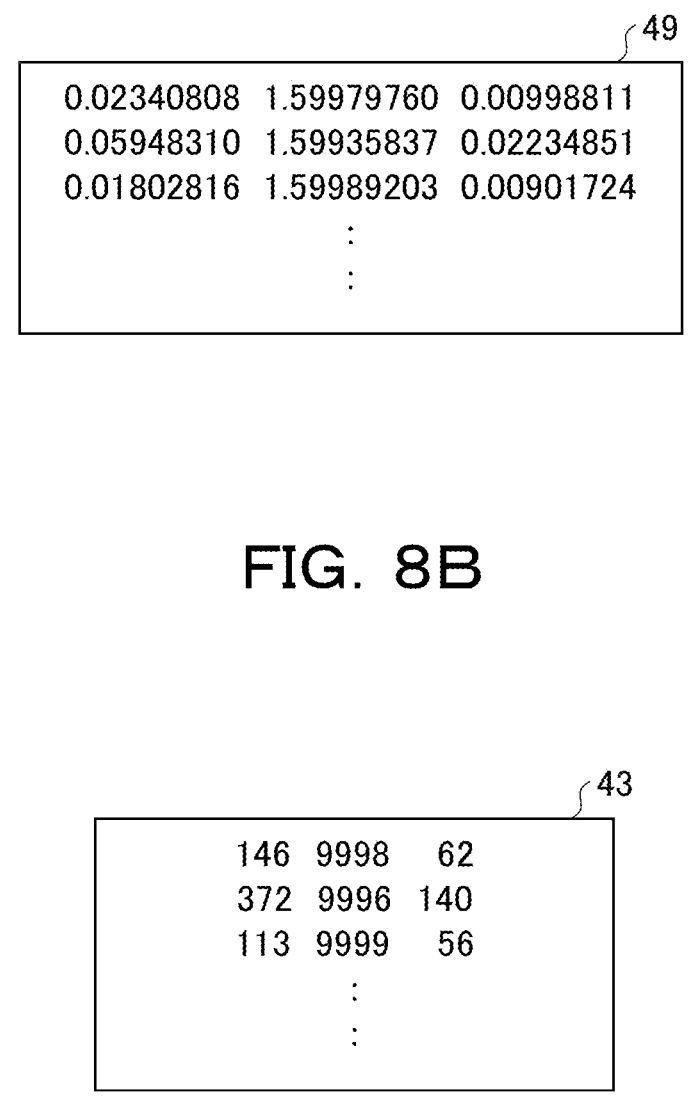

The multiplication results (0.02336, 1.59968, 0.00992) correspond to (Mx", My", Mz") (i.e., (0.02336, 1.59968, 0.00992)=(Mx", My", Mz")). FIG. 8A and FIG. 8B are diagrams illustrating examples of the data for visualization. In FIG. 8A, examples of uncompressed visualization data 49 are illustrated. Each component of the magnetization vector is represented by an 8-byte double-precision floating point number. A 24-byte is allocated for a single magnetization vector (0.02340808, 1.59979760, 0.00998811) such that the size of the visualization data may exceed 30 GB.

In FIG. 8B, the compression-completed visualization data 43 subjected to the data compression processing is illustrated. A single magnetization vector (0.02340808, 1.59979760, 0.00998811) of FIG. 8A is represented as the magnetization vector (146, 9998, 62) in FIG. 8B. Since each component of the magnetization vector of FIG. 8B is represented by a 2-byte integer, a single magnetization vector is representable by a 6-byte.

A data amount may be reduced to one fourth of the uncompressed visualization data 49 of FIG. 8A in the compression-completed visualization data 43 illustrated in FIG. 8B.

Some degree of information corresponding to a fraction after the decimal point of each component may be missed when each component of the magnetization vector is represented by being converted from the double-precision floating point number to an integer number. However, information of three significant digits of the effective number may be enough to render the magnetization vector in the viewpoint of visualization. Therefore, when a number having three or more digits is designated as the value Va, the data compression may be performed without impairing the precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetization vector storing method in a magnetic field simulation of a magnetic material having a magnetization vector, the method comprising:
   setting an external magnetic field at a predetermined time;
   calculating an equation that describes a precessional motion of magnetization in the magnetic material according to a time lapse;
   acquiring, by a computer, a saturation magnetization value of the magnetic material to be simulated from a database;
   dividing each component of the magnetization vector indicating a magnetization state of the magnetic material to be simulated by the saturation magnetization value;
   converting each component of the magnetization vector obtained after the dividing using the saturation magnetization value as a reference value into an integer value to compress the magnetization vector; and
   storing the integer value converted from the magnetization vector in the database.

2. The magnetization vector storing method according to claim 1, wherein each component of the magnetization vector obtained after the dividing is converted into the integer value by multiplying each component of the magnetization vector by a value of three or more digits.

3. The magnetization vector storing method according to claim 1, further comprising:
   dividing each component of the magnetization vector converted into the integer value from the database by a value of three or more digits; and
   multiplying each component of the magnetization vector obtained after the dividing using the value of three or more digits by the saturation magnetization value, thereby restoring a corresponding magnetization vector.

4. The magnetization vector storing method according to claim 1, further comprising: acquiring the magnetization vector indicating the magnetization state in time series; and storing the magnetization vector converted into the integer value in the database in time series.

5. A magnetization vector data compression method in a magnetic field simulation of a magnetic material having a magnetization vector, the method comprising:
acquiring a saturation magnetization value of the magnetic material to be simulated from a database;
dividing each component of the magnetization vector indicating a magnetization state of the magnetic material to be simulated by the saturation magnetization value;
converting each component of the magnetization vector obtained after the dividing using the saturation magnetization value as a reference value into an integer value to compress a data amount of the magnetization vector; and
storing the integer value converted from the magnetization vector in the database.

6. A magnetic field simulator device comprising:
a memory configured to store a program; and
a processor coupled to the memory and configured to execute the program,
the processor is configured to, based on the program:
set an external magnetic field at a predetermined time;
calculate an equation that describes a precessional motion of magnetization in the magnetic material according to a time lapse;
acquire a saturation magnetization value of the magnetic material to be simulated from a database;
divide each component of the magnetization vector indicating a magnetization state of the magnetic material to be simulated by the saturation magnetization value;
convert each component of the magnetization vector obtained after a division into an integer value to compress the magnetization vector; and
store the integer value converted from the magnetization vector in the database.

7. The magnetic field simulator device according to claim 6, wherein each component of the magnetization vector obtained after the dividing is converted into the integer value by multiplying each component of the magnetization vector by a value of three or more digits.

8. The magnetic field simulator device according to claim 6, wherein the processor is configured to:
divide each component of the magnetization vector converted into the integer value from the database by a value of three or more digits; and
multiply each component of the magnetization vector obtained after the dividing using the value of three or more digits by the saturation magnetization value, thereby restoring a corresponding magnetization vector.

9. The magnetic field simulator device according to claim 6, wherein the processor is configured to:
acquire the magnetization vector indicating the magnetization state in time series; and
store the magnetization vector converted into the integer value in the database in time series.

10. The magnetization vector storing method according to claim 1, further comprising multiplying each component of the magnetization vector with a predetermined value and truncating a fraction after a decimal point of the magnetization vector.

11. The magnetization vector data compression method according to claim 5, further comprising multiplying each component of the magnetization vector with a predetermined value and truncating a fraction after a decimal point of the magnetization vector.

12. The magnetic field simulator device according to claim 6, wherein the processor is further configured to multiply each component of the magnetization vector with a predetermined value and truncate a fraction after a decimal point of the magnetization vector.

* * * * *